April 12, 1966  H. R. NILSSON ETAL  3,245,612
ROTARY PISTON ENGINES
Filed May 17, 1965  10 Sheets-Sheet 1

INVENTORS
Hans Robert Nilsson
Lauritz Benedictus Schibbye

BY
James C. Marble
ATTORNEY

April 12, 1966 H. R. NILSSON ETAL 3,245,612
ROTARY PISTON ENGINES
Filed May 17, 1965 10 Sheets-Sheet 2

INVENTORS
Hans Robert Nilsson
Lauritz Benedictus Scheltbye
BY
James M. Marker
Their ATTORNEY April 12, 1966  H. R. NILSSON ET AL  3,245,612
ROTARY PISTON ENGINES
Filed May 17, 1965  10 Sheets-Sheet 7

INVENTORS
Hans Robert Nilsson
Lauritz Benedictus Schøttye
BY
ATTORNEY

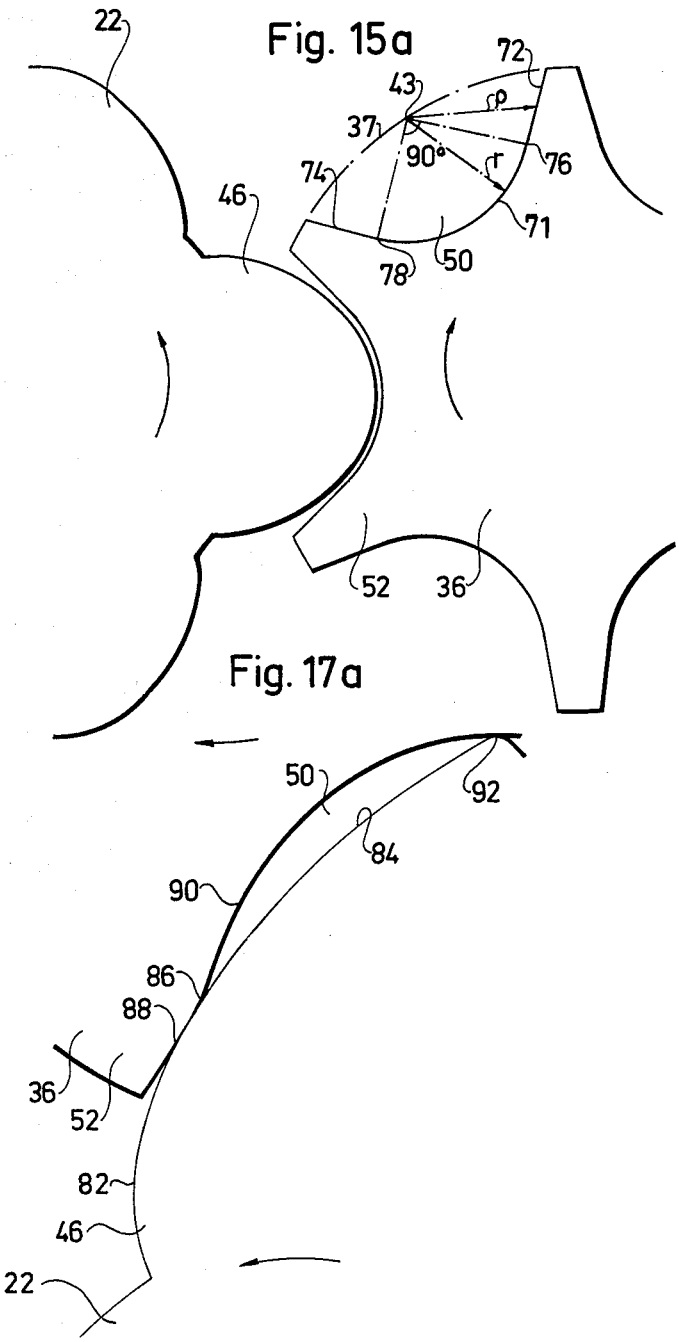

United States Patent Office 3,245,612
Patented Apr. 12, 1966

3,245,612
ROTARY PISTON ENGINES
Hans Robert Nilsson, Ektorp, and Lauritz Benedictus Schibbye, Saltsjo-Duvnas, Sweden, assignors to Svenska Rotor Maskiner Aktiebolag, Nacka, Sweden, a corporation of Sweden
Filed May 17, 1965, Ser. No. 462,783
14 Claims. (Cl. 230—143)

This application is a continuation-in-part, replacing our application Serial No. 195,527, filed May 17, 1962, now abandoned.

The present invention relates to rotary piston engines comprising at least two cooperating male and female rotors with intermeshing helical lands and grooves and a casing providing a working space comprising coplanar intersecting bores for the rotors. The working space is provided with barrel walls and with low pressure and high pressure ports for a working fluid. The lands and grooves of the rotors are so shaped that they pass into and out of mesh with each other and together with the walls of the working space provide chevron shaped chambers each comprising communicating groove portions of two cooperating rotors. The chambers vary in volume and communicate at different times with the low pressure and the high pressure ports as the rotors revolve. Each male rotor land has two different flanks, each extending from the root circle of the rotor to the crest circle thereof, having at least its major portion located outside the pitch circle of the rotor and provided with a generally convexly curved profile. Each female rotor groove has two different flanks, each extending from the root circle of the rotor to the crest circle thereof, having at least its major portion located inside the pitch circle of the rotor and provided with a generally concavely curved profile.

Such rotary piston engines can be used as expanders as well as compressors and even if in the continuation of this specification they are only spoken about as compressors it is selfevident that the flank profiles characterizing the invention can be used with the same advantages also in expanders.

All earlier known profiles of the flanks of the lands and grooves of the rotors have been shaped in such a way that one point of the flank of the female rotor groove, generally located near its pitch circle, generates the whole or at least a substantial portion of the mating flank of the land of the male rotor. This characteristic has been one of secondary importance for earlier known types of rotary piston engines, whether compressors or expanders, with rotors that have been connected by synchronizing gears so that a clearance has been maintained between the rotor flanks and direct contact therebetween has been avoided. It is, however, a desire to have the rotors directly contacting each other and thus to eliminate the synchronizing gear. In this way, however, there will be new problems since as said above all profiles of flanks known up to now for rotary piston engines of the actual type have as a characteristic that a point located on the flank of the groove of the female rotor will generate the whole or a substantial portion of the mating flank of the land of the male rotor. This characteristic causes at direct contact that the wear of this point of the female rotor flank will be disproportionately large in relation to the wear of the other parts of the same flank as this point will slide along a line of the mating flank while the other points of the flank only momentarily cooperate with the mating flank and with certain types of profile, viz., a generally circular one which is shown in Nilsson Patent No. 2,622,787, granted December 23, 1952, these other points make only a rolling contact without any sliding in relation to the mating flank so that the wear is practically zero.

A purpose of the present invention is to eliminate this generation by a single point and to make a new profile which among its other characteristics also has the one that the flanks of the rotors move in relation to each other by a combined movement comprising a rolling motion and a sliding motion, whereby the sliding motion which is due to the difference in length of the mating flanks is distributed over a multiplicity of points lying along a continuous line. Each of these points generates only a part of the mating flank which part is practically a point. In this way the sliding speed between the flanks at the cooperating point is reduced to a fraction of the relative sliding speed between the cooperating points of the flanks produced by generation by a single point. Furthermore the grooves of the female rotor of the invention are wider than the corresponding grooves of earlier known profiles so that the flanks of these grooves cross the pitch circle at more blunted angles and thus has greater firmness than the earlier known profiles. In this way the risks of damages to the edge of the female groove are decreased and for this reason the crest diameter of the female rotor with advantage can coincide with the pitch diameter of the rotor whereby the area of the blow holes from one groove to another which are known per se will be reduced. This last-mentioned advantage, however, is not limited to engines without synchronizing gears, but applies to all engines of the actual type. The detail shaping of the invention which in the above-mentioned way solves the present problems will be clearly described in the continuing parts of this specification.

Another problem in rotary piston engines of the actual type is to shorten the sealing line of each of the chevron shaped chambers formed by communicating groove portions. These sealing lines are composed of several parts, viz. one part that seals between the ends of the rotors and the cooperating end wall of the working space, another part that seals along the crest of each rotor land between this crest and the barrel wall of the working space, and a third part that seals between the rotors themselves. Furthermore a leakage opening or blow hole appears for certain types of rotor profiles through a break in the continuity of the sealing line due to the fact that the parts of the sealing line between the crests of the different rotors and the corresponding barrel walls of the working space do not cross the intersection line between the bores of the working space at one and the same point, but at different points which are axially displaced in relation to each other. Of the mentioned parts of the sealing line different parts seal between different parts of the engine. Thus the part of the sealing line located between the crests of the rotor lands and the barrel wall seals only between adjacent chevron shaped chambers between which the pressure difference is only a fraction of the pressure difference between the high pressure and the low pressure ports so that the loss due to the leakage from chamber to chamber is relatively small. There is no possibility to change the length of this part of the sealing line by varying the profiles of the flanks. The part of the sealing line located between the rotor end and the end wall of the working space is composed of two different parts, viz. one part sealing generally circumferentially in opposite direction to the rotation of the rotors between adjacent chevron shaped chambers in the same way as said above regarding the parts of the sealing line located between the crests of the lands and the barrel walls and one part sealing generally circumferentially in the same direction as that of the rotation of the rotors between the chevron shaped chamber and the rotor grooves communicating with the low pressure port. Regarding this part of the sealing line no variation of the profiles of the flanks can change the length of this part of the sealing line either. The part of the sealing line located between the rotors seals between a chevron shaped chamber and the remaining portions of the grooves forming this chamber which remaining portions communicate with the low pressure port. The pressure difference across this part of the sealing line is therefore greater than the pressure difference across the part of the sealing line located between the crests of the lands and the barrel walls and the difference moreover increases the closer to the high pressure port the chamber is located. The losses due to the leakage between the rotors are thus considerably greater than those due to the leakage between the crests of the lands and the barrel walls. It is for this reason considerably more important to try to decrease the length of the part of the sealing line located between the rotors than the part located between the crests of the lands and the barrel walls. It is even so that a decrease of the part of the sealing line between the rotors can justify an increase of the blow hole mentioned above between two adjacent chevron shaped chambers in consequence of the break in the continuity of the sealing line.

This problem is old and it has earlier been the basis for several inventions.

In the first proposition for a screw compressor the land of the male rotor was composed of two flanks each of which was generated by a point on the mating flank of the groove of the female rotor located at the pitch circle thereof while each of the flanks of the groove of the female rotor was generated by a point at the crest of the mating male rotor land. Flanks of this type produce a long sealing line between the rotors which for a male rotor land starts at the innermost point of one flank and follows the generating edge of the mating female rotor flank to a point at the crest of the land, then follows the crest to a point at which it crosses the generating edge of the other female groove flank from where it follows this edge to a point at the innermost portion of the second flank of the male rotor land which is located on the same axial line as the starting point at the first flank and then follows this axial line along the bottom of the groove to the corresponding starting point of the adjacent land.

The solution which up to now has proved to be the best one comprises a female rotor groove with circular profile with its centre on the pitch circle and a correspondingly shaped male rotor land. With this profile a sealing line is obtained which starts at the innermost point of one flank of the male rotor land and follows the generating edge of the mating female rotor flank, as mentioned above for the sealing line generated by a point, to a point of the flank of the land in which the outer circular profile of the land begins. At this point the sealing line is changed to a direction perpendicular to the axes of the rotor, which direction is maintained over all the circular outer part of the land to a point at which the sealing line is changed to follow the generating edge of the other female groove flank to a point at the innermost portion of the second flank of the male rotor land. This point is located on the same axial line as the starting point at the first flank. From this point the sealing line follows this axial line to the corresponding starting point of the adjacent land.

The sealing line between two lands of different screw rotors described above is thus composed of three separate portions which meet each other at acute angles. The line has two outer portions which are curved and follow the edges of the female rotor groove and an intermediate portion. In the first mentioned type of engine this intermediate line portion follows the crest of the male rotor land while in the second type of engine it is perpendicular to the axis of the rotor.

Another purpose of the present invention is to further shorten this sealing line and to replace the three portions mentioned above by a single continuous slightly S-shaped curve. The tangents to this curve parallel with the axes of the rotors will lie considerably closer to a line drawn through the points of the sealing line at the innermost portions of the lands than the crossing points between the different sealing line portions of the circular profile do. The first mentioned distance can in this way be decreased down to about 50% of the latter one. The length of the sealing line decreases simultaneously considerably and will approach to about 60% of the length of the sealing line of the circular profile. As the cooperating point between two mating flanks moves continuously along both the mating flanks and as a flank of the groove at the point of cooperation has a tangent common to that of the flank of the land very pointed wedge-shaped interspaces are formed on either side of the point of cooperation. As these interspaces closely to the point of cooperation have a very small extent perpendicular to the flanks of the rotors there is in practice in each transverse section not a sealing point but a sealing line and axially along each rotor land there is thus not a sealing line but a band-shaped sealing area which in combination with the shortening of the sealing line aids in the reduction of the leakage between the rotors to a very low value. Also concerning this problem the details of the shape of the lands according to the invention will be described in the continuing parts of this specification.

One further problem that is to be found in engines of the type under consideration and that more and more calls for a solution is the noise which is produced during operation. One of the factors that influences this noise is the variation of the speed of the working fluid within different parts of the chevron shaped chamber as a consequence of the distribution of the changes of the volume within different parts of the chamber. Such problems arise especially in chambers which are open towards the high pressure port as those chambers in compressors have to go down to zero volume and in expanders have to start from zero volume.

Rotors having each flank generated by a point will completely close the chambers in radial direction so that they must be emptied in axial direction which causes other problems too well known to everyone skilled in the art to need any discussion in this specification. The essential result in this type of engines is that the outlet area from this chamber is so small in relation to the decreasing of the volume per time unit that the outlet speed of the working fluid must be much higher than the average speed of the working fluid passing the engine. In this way interference phenomena arise which cause a considerable noise.

Rotors with a generally circular profile provide a pocket in the female groove extending along the whole length of both the flanks of the female rotor groove. This pocket has all the time a radial opening but this opening is closed at exactly the same moment as the pocket momentarily is closed over its complete length and brought down to zero volume. There is thus a considerable difference between the speed of the working fluid from the pocket and the average speed of the working fluid passing the engine. Owing to interference phenomena there is also here a production of noise even if it is not as prominent as the noise with rotors having flanks generated by a point.

A further purpose of the present invention is to decrease the noise reduced as said above. This decrease is brought about by the fact that when the profile of the flanks according to the invention the point of cooperation between the flanks travels continuously along the flanks of both the rotors from the innermost point of a first male rotor flank and the corresponding edge of a first female rotor groove to the innermost point of the second male rotor flank and the corresponding second edge of the second female rotor groove so that the pocket located between the female rotor groove and the male rotor land is emptied continuously before it is closed definitely. In this way there will be no exceptionally high speeds of the working fluid and the part of the noise which normally arises from differences in speed will be eliminated. Also concerning this problem the details of the shape of the flanks according to the invention which in the way said above solves the actual problem will be clearly described in the continuing part of this specification.

In addition to the advantages said above of an engine according to the invention in relation to all earlier known engines of similar types such an engine has further advantages which are common to the earlier known engine with generally circular profile but which distinguishes it from other known engines.

An important advantage is that there are no closed pockets running out to zero volume and as said above especially in connection with the noise the pocket of an engine according to the invention will be emptied still better than the pockets of an engine with circular profile of the rotors.

Another important advantage of an engine according to the invention is that it is possible to provide the crests of the lands of the male rotor as well as the crests of the lands of the female rotor with radially directed strips for sealing against the barrel walls of the working space.

The rotor profile according to the invention has furthermore the advantage that it can be combined with earlier known profiles so that either each flank of a male rotor land and the mating flank of the female rotor groove is provided completely with a profile of one type while the other flank is provided with a profile of another type or one and the same flank is composed of parts of profiles of different types. In this way the volume of the rotor grooves, the area of the blow hole, and the volume of the closed pockets can all be controlled in a simple way.

The rotor profiles according to the invention are specially suitable for so-called wet compressors in which a liquid preferably oil is injected into the working space for cooling and sealing purposes. These engines are specially suitable for action without a synchronizing gear as the supplied oil lubricates the flanks of the rotor lands and grooves. The profiles of the flanks of the lands and grooves according to the invention will then produce a wedge-shaped oil film which is perfect to decrease the friction and thus the wear of the cooperating parts of the flanks.

Also for the solution of another important problem of wet compressors, viz, the risk that oil is enclosed into pockets the volume of which will be brought down to zero volume, the invention means a considerable advantage as the pockets of an engine according to the invention as already said above will never be closed and furthermore will be evacuated in a more gentle way than for any earlier known profile of the flanks.

The invention will now be described more in detail in connection with the embodiments which are shown in the accompanying drawings.

FIG. 15a shows a detail of FIG. 15 on a larger scale.

FIG. 17a shows a detail of FIG. 17 on a larger scale.

Figure 1:
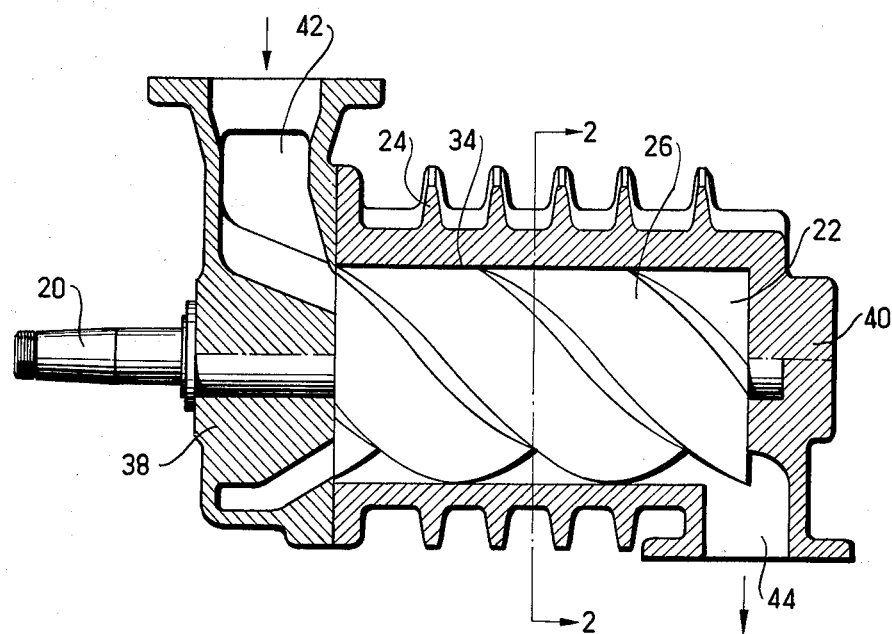
FIG. 1 shows a longitudinal section along the line 1—1 in FIG. 2 through a compressor according to the invention.
Figure 2:
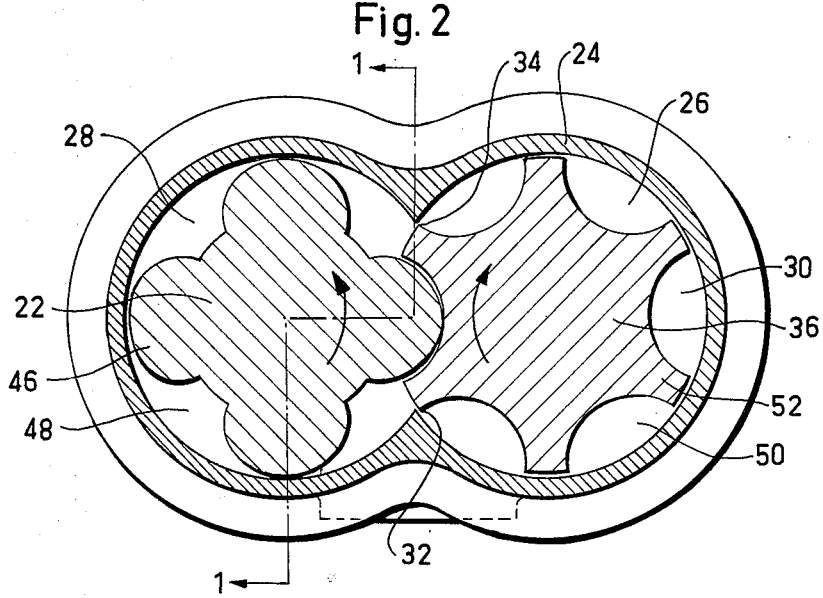
FIG. 2 shows a cross-section along the line 2—2 in FIG. 1.
Figure 2A:
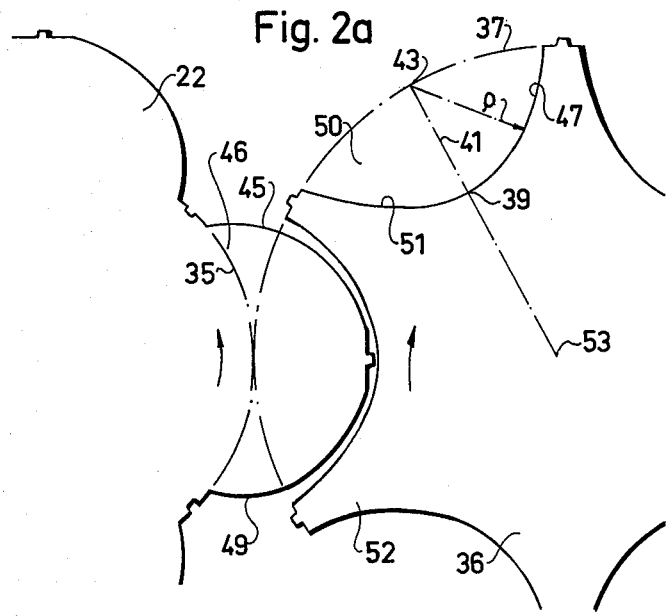
FIG. 2a shows a detail of FIG. 2 on a larger scale.
Figure 3A:
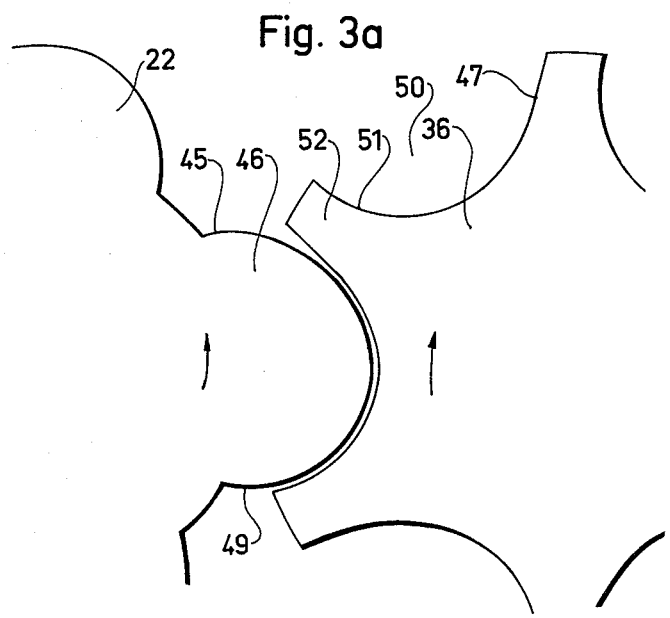
FIG. 3a shows a detail of FIG. 3 on a larger scale.

In the compressor shown in FIGS. 1, 2 and 2a a shaft 20 is driven from a source of power not shown. The shaft 20 is rigidly connected with a male rotor 22 which is located in a casing 24 provided with a working space 26 comprising two parallel bores 28, 30 in the casing 24 which bores intersect along the lines 32 and 34. The male rotor 22 is located in the bore 28 while a female rotor 36 cooperating with the male rotor by direct flank contact is located in the bore 30. The two rotors 22, 36 are mounted for rotation in the end walls 38, 40 of the casing 24. The working space 26 is provided with a low pressure port 42 and a high pressure port 44 for the gaseous working fluid.

The female rotor 36 is provided with six helical grooves 50 with a wrap angle of about 200° located inside the pitch circle 37 of the rotor and with intervening lands 52. Each groove 50 has two flanks 47, 51 each extending from a point 39 at the root circle of the rotor to a point at the crest circle coinciding with the pitch circle 37 and provided with a concave profile. In a plane transverse to the axis of the rotor the flanks 47, 51 of each rotor groove 50 follows a curve defined by a parabola having its vertex at the radially innermost point 39 of the groove 50 and its focus 41 located radially outside thereof at a distance which is half the distance from the radially innermost point 39 to the point 43 of intersection with the pitch circle 37 of a radial line drawn from the centre 53 of the rotor through the radially innermost point 39 of the groove 50.

The male rotor 22 is provided with four helical lands 46 having a wrap angle of about 300° and located outside the pitch circle of the rotor and with intervening grooves 48. Each land 46 has two flanks 45, 49 each extending from a point at the root circle coinciding with the pitch circle 35 to a point at the crest circle of the rotor and provided with a convex profile.

As clearly shown in FIG. 2a the flanks 45, 47, 49, 51 of the lands and grooves of the rotors 22, 36 have quite new profiles and seen in a plane transverse to the axes the rotors sealingly cooperate at maximum mesh only at the crest of the male rotor land 46 and the bottom 39 of the female rotor groove 50. In the earlier used profiles for screw compressors in addition to the cooperation at this point the male rotor land 46 and the female rotor groove 50 cooperate for sealing at maximum mesh in such a way that in the completely generated profile the flanks of the male rotor land are in sealing proximity to the groove also at each edge of the groove and in the generally circular profile the male rotor land is in sealing proximity to the female rotor groove along the whole length of the flanks of the groove.

The essential point of the present invention is these profiles of the flanks and the way in which they cooperate. Each flank is generated by a point on the mating flank which point travels continuously along the flank from one end to the other and simultaneuosly the mating flank is generated by a point on the first mentioned flank which point travels along this flank from one end to other. For this reason the edge of a female rotor groove located at the pitch circle does not generate any considerable portion of the mating flank of a male rotor land but only a very small portion more or less in the form of a point thereof, whereby the wear of this edge is practically eliminated at the same time as the length of the sealing line between the two cooperating rotors is considerably reduced. This result is obtained by shaping the female rotor groove in such a way that the flank thereof is defined by a radius vector swung from the point of intersection 43 with the pitch circle 37 of a radial line drawn from the centre 53 of the rotor through the radially innermost point 39 of the flank, the length of which radius vector decreases continuously as the vector is swung from the pitch circle to the radially innermost point of the flank.

The result of this type of flanks is that the point of coperation between the flanks travels continuously along bothe the mating flanks so that the flanks carry out a combined rolling and sliding movement in relation to each other. In order to distinguish this type of generation from the earlier known point generation it will be called travelling generation.

Even though in the embodiment shown a completely travelling generated flank of the female rotor groove is shaped as a certain parabola, such a travelling generation can also be produced by other forms of the flank, the only nceessary requirement being that the flank of the groove all the way from the root circle to the pitch circle lies outside a circle having its centre on the pitch circle at the point of intersection with a radial line from the centre of the rotor drawn through the radially innermost point of the flank. However, in order to get an acceptably small width of the groove so that it will be possible to locate a certain number of grooves having a reasonable radial depth inside the pitch circle of the rotor it is suitable to provide the flank with a form following a curve of the second degree as a parabola, circle or ellipse fulfilling the necessary requirement mentioned above.

Of course it is not necessary that the lands and grooves of the rotors are bound by the corresponding pitch circles but as earlier known the lands and grooves can extend to the other side of these circles owing to such factors as the desirability of less sharp corners of the edges of the female rotor grooves, exactly the same outer diameter of the rotors and so on. Profiles produced by travelling generation have, however, a larger "corner angle" at the pitch circle of the female rotor groove than earlier known profiles. Preferably this "corner angle" will be about 90° which has been impossible to reach with the earlier known profiles. One of the reasons for addendum portions of the female rotor lying outside the pitch circle of the rotor is thus eliminated and that is the risk of damaging the edges of the female rotor. As the decrease of the addendums of the female rotor means a simultaneous decrease of the blow hole a profile according to the invention will in this way cause an improvement of the efficiency of the engine.

Figure 12:
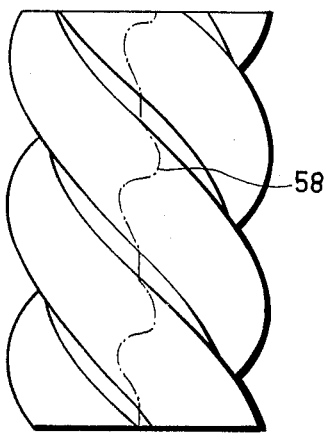

How the sealing point between the flanks of the rotors travels along the flanks is best shown in FIGS. 4–7. In these figures the male rotor lands 46 and the female rotor grooves 50 are drawn asymmetrically to facilitate a comparison between the characteristics of the new profile and the generally circular profile. In view of this fact these figures will not be described in detail until later on in this specification. However, so much can already now be mentioned that owing to the fact that the point of cooperation of the flank of the groove travels continuously from the edge to the bottom of the groove the projection of the sealing line between the rotors will get a shape as shown in FIG. 12. However, the characteristic of this sealing line will also be dealt with more in detail later on.

Figure 3:
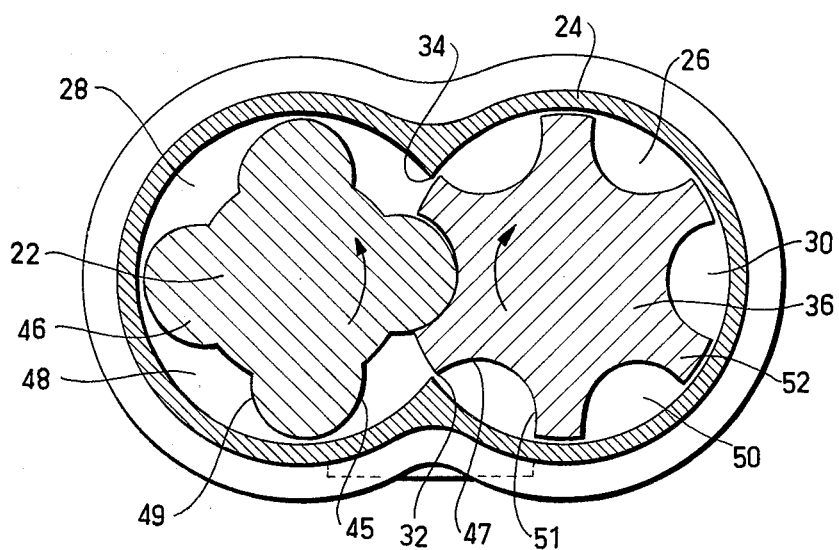
FIG. 3 shows a cross-section similar to that in FIG. 2 but with modified profiles of the rotors.

FIG. 3 shows a cross-section through a compressor similar to the cross-section in FIG. 2 with rotors, the profile of which are of a modified type. The male rotor lands 46 as well as the female rotor grooves 50 are thus asymmetric and composed of flanks 45, 47 which are leading in the direction of operation and produced by travelling generation in the same way as said above in connection with the rotor profiles shown in FIG. 2 while the trailing flank 51 of the groove is shaped as a circular arc having its centre on the pitch circle of the rotor and the trailing flank 49 of the land is shaped with an outer circular portion and an inner portion generated by a point as known per se. The advantage of this asymetric profile compared with the symmetric one is that the blow hole from a chevron shaped chamber comprising communicating groove portions of the two rotors to an adjacent chevron shaped chamber in this way will not be greater than the blow hole of the earlier known generally circular profile while at the same time the leading flank 45 of the land of the male rotor which flank drives the female rotor and the mating flank 46 of the groove of the female rotor are shaped in such a way that any generation of the flank or a portion thereof by a fixed point on the mating flank is avoided.

Figure 4:
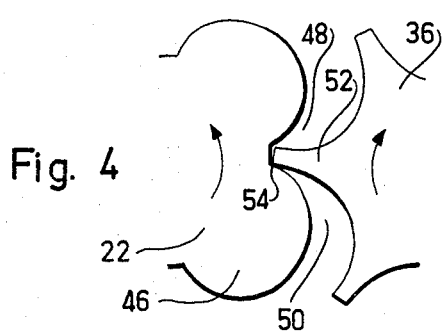
FIGS. 4–9 show as a principle the instantaneous relative angular positions of two rotors with profiles according to the embodiment shown in FIG. 3.
Figure 5:
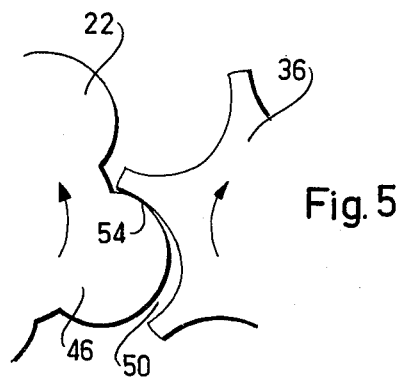
Figure 6:
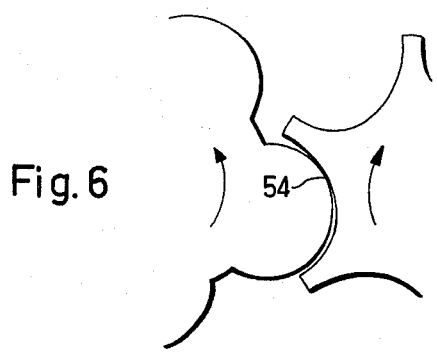
Figure 7:
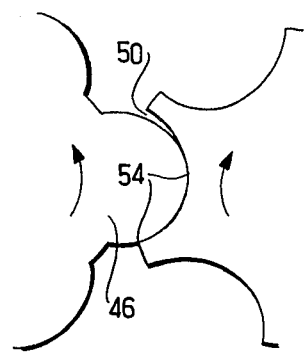
Figure 8:
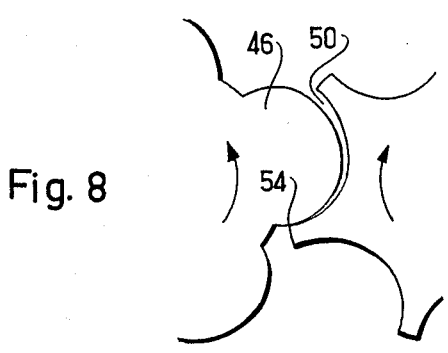
Figure 9:
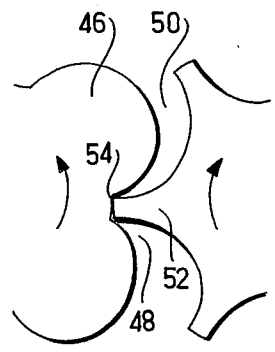

In FIGS. 4–9 the rotor profiles of FIG. 3 are shown schematically in several different relative angular positions. In FIG. 4 the position is shown where the crest of the female rotor land 52 has just finished its rolling operation along the bottom of the male rotor groove 48, so that the edge of the crest of the female rotor land 52 sealingly cooperates with the root of the male rotor land 46 at a point of cooperation 54. From this position the rotors then continue their revolving to the position shown in FIG. 5, where the point of cooperation 54 between the flanks of the land of the male rotor 22 and the groove of the female rotor 36 has travelled along the flank of the male rotor land 46 as well as along the flank of the female rotor groove 50. The distances that the point of cooperation has travelled along the two flanks are different as one flank lies inside and the other one lies outside the pitch circle of the respective rotor which means that the two flanks have performed a combined rolling and sliding movement in relation to each other. FIG. 6 shows a further position of the rotors in relation to each other which position still more shows that the point of cooperation 54 continuously travels along both flanks but with a higher speed along the male rotor flank than along the female rotor flank owing to the greater length of the male rotor flank. In FIG. 7 the male rotor land 46 has come to its position for maximum mesh into the female rotor groove 50. The point of cooperation 54 has then travelled along the leading flanks of the male rotor land 46 and of the female rotor groove 50 in such a way that it has reached their end points at the same moment, i.e. the crest of the male rotor land 46 cooperates with the bottom of the female rotor groove 50. Simultaneously the trailing flank of the male rotor land 46 cooperates with the trailing flank of the female rotor groove 50 along the whole length thereof which as known is a characteristic of the generally circular profile. In FIG. 8 a position is shown where the rotors have revolved further a small angle in relation to each other. Upon this revolving movement the point of cooperation 54 between the rotors has in one step moved to the edge of the trailing flank of the female rotor groove 50, and thereafter this edge performs a generating sliding movement without rolling along the inner part of the flank of the male rotor land 46. In FIG. 9 finally the position is shown where the edge of the female rotor groove 50 has reached the root of the flank of the male rotor land 46 and in which the crest of the female rotor land 52 will just start its rolling movement along the bottom of the male rotor groove 48.

FIGS. 4–9 illustrate very clearly the difference between flanks produced by traveling generation and generally circular flanks. As seen from these figures there is an essential difference between the different profiles. In the case of the circular profile the point of cooperation 54 in a plane transverse to the axes of the rotors at first lies at the leading edge of the female rotor groove which slides along the inner part of the male rotor land and then via a mometary cooperation along the whole length of the groove directly moves to the other end of the circular profile of the groove whether the circular profile comprises both or only one of the flanks of the groove. In the case of the profile produced by travelling generation on the other hand the point of cooperation 54 travels continuously along both the mating flanks, whereby the relative sliding speed between the flanks is less than at the generated root portion of the generally circular profile. In this way the wear owing to friction at direct contact will be decreased and it will simultaneously be distributed all over the flanks instead of comprising only the edge of the female rotor groove 50 and the inner portion of the male rotor land 46 that is generated by the edge. Furthermore the effect is obtained by the moving point of cooperation that the pocket between the flanks of the groove and the land is continuously decreased as its trailing end, the point of cooperation 54, moves in the direction opposite to that of the rotation of the rotors as shown in FIGS. 4–7. A symmetrical profile produced by travelling generation as shown in FIG. 2 which can be illustrated by a mirror image of FIGS. 4–7 brings down the volume of said pocket to zero by the continuous travelling of its inner end from the bottom to the edge of the groove so that the pocket disappears in a gentle way. The corresponding pocket of the circular profile on the other hand extends from its forming to its disappearing over the whole length of both the flanks of the groove and at its disappearance the pocket is momentarily closed all over the length of the flanks, i.e. the outer end of the pocket brings the pocket to zero volume in the same degree as the inner end does, whereby an accelerated speed of the discharge from the pocket is obtained.

Owing to this gentle disappearance of the pocket there will be no abrupt increase of the pressure in the pocket with acceleration following therefrom of the working fluid discharged from the pocket. This increase of pressure and acceleration which has been produced by all earlier known rotor profiles has been the source of a non-uniform speed of the working fluid and thus of the vibrations and the noise derived therefrom. The sound derived from this source of noise is thus eliminated by the type of profile according to the invention.

Furthermore the sealing between flanks with profiles produced by travelling generation is obtained between two curved surfaces having a common tangent at the point of cooperation and having about the same radii of curvature so that this sealing in a plane transverse to the axes of the rotors cannot be considered as a point sealing but a line sealing as the opening between the cooperating flanks extending over a considerable angle of the flank is so small that a sealing effect is obtained. The total three-dimensional sealing will for this reason not be a sealing along a line but a sealing along a band which is much more effective than the sealing over the edge of the groove of earlier known profiles which sealing cannot form such an opening with circumferential extension on more than one side of the theoretical sealing point. The sealing over the theoretical sealing line will for this reason be considerably more effective for the profile produced by travelling generation than for the generally circular one.

It must be observed that all comparisons with earlier known profiles have been made with the circular profile which owing to wear, elimination of pockets, as well as sealing is clearly superior to the other earlier used profile, i.e. the profile generated by a point.

Figure 10:
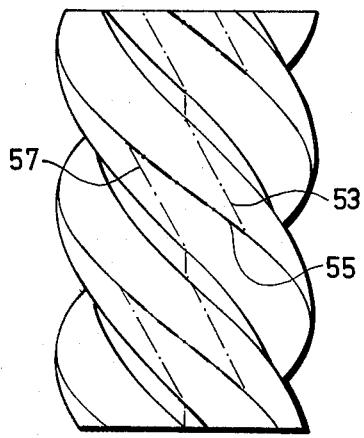
FIGS. 10–13 show the sealing line between two rotors projected on the male rotor for different types of profiles of the rotors.
Figure 11:
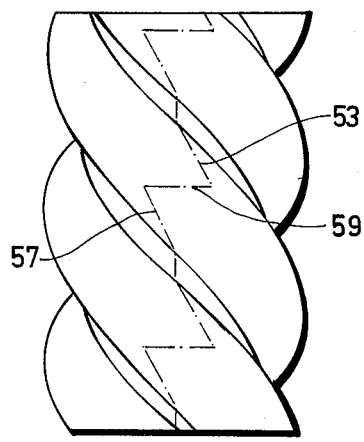

It is, however, not only the effectiveness of the sealing over the sealing line that is of importance but also the length of this sealing line. In FIGS. 10 and 11 the sealing lines have for this reason been projected on the male rotors for the flank profiles used up to now, i.e. the profile generated by a point and the generally circular profile, respectively. These figures are moreover already shown in Nilsson Patent No. 2,622,787 granted Dec. 23, 1952 as an illustration of the great improvement from sealing view that the change from the profile generated by a point to the circular one means. FIG. 10 shows a sealing line of a land generated by a point. The leading flank of the male rotor land sealingly meshes with the edge of the female rotor from the root to the crest of the land along a line 53, the crest of the land sealingly meshes with the flanks of the groove from one edge to the other along a line 55, and the other edge of the groove sealingly meshes with the trailing flank of the land along a line 57. FIG. 11 shows a sealing line of the circular profile. The line 55 in FIG. 10 along the crest of the land is replaced by a line 59 perpendicular to the axes of the rotor so that the length of the lines 53 and 57 simultaneously are decreased to about half their length.

Figure 13:
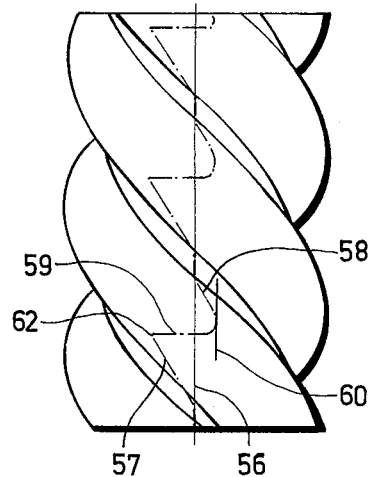

In FIG. 12 the projection on a male rotor of the sealing line 58 between the rotors with symmetrical profiles produced by travelling generation has been shown in a corresponding way. Owing to the fact that the sealing point on the female rotor groove as shown above is not fixed to the edge of the groove but immediately starts travelling inwardly towards the bottom of the groove the sealing line 58 forms a smaller angle with the axes of the rotor than the lines 53 and 57 do, as shown in FIGS. 10 and 11. As the sealing line produced by travelling generation is continuous as also shown above, it will have no points with break of the continuity which in form of acute angles of the sealing lines are characteristics of the earlier known profiles. The sealing line 58 will thus as shown in FIG. 12 follow a continuously curved line the tangents of which parallel with the axis of the rotor will lie considerably closer to said axis than the sharp angles of the earlier known sealing lines. The length of the sealing line is for this reason considerably shorter than the length of the earlier known profiles. FIG. 13 shows in the same way the sealing line 58, 59, 57 of an asymmetric profile according to FIG. 3. FIG. 13 is especially adapted for comparison of the projections on the male rotor of the sealing lines of a rotor profile produced by travelling generation and of a generally circular profile. As shown in FIG. 13 the distance from the axis 56 of the rotor to the tangent 60 parallel with this axis of the sealing line 58 of the profile produced by travelling generation is less than 50% of the distance from the axis 56 to the point of intersection 62 between the parts 59, 57 of the sealing line of the circular profile. The length of the line 58 from the root to the crest of the land will in this way be about 60% of the length of the corresponding part of the sum of the length of the lines 57 and 59. It is not impossible to further decrease the length of the line 58. The total length of the sealing line the projection of which is shown by the line 58 decreases simultaneously to 65–70% of the length of the corresponding sealing line of the circular profile. However, this sealing line will be shortened still more with a shape of the profile which as said above will shorten the length of the line 58 in relation to the embodiment shown.

As said above an improved sealing between the rotors is obtained owing to a shortened sealing line as well as to a broader sealing area. The leakage between the rotors will in this way decrease considerably which is essential for engines of the type as said leakage is a leakage from a chevron shaped chamber to groove portions communicating with the low pressure port while the leakage between two adjacent chevron shaped chambers is of less importance owing to the relatively small difference of pressure between the two adjacent chevron shaped chambers. The total leakage between the rotors will as seen from the information given above decrease to about 55% of the corresponding leakage in a similar engine provided with rotors of generally circular profile and as already said this leakage can be further decreased by further change of the profile. The increase of the blow holes between adjacent chevron shaped chambers that will be the result if the trailing flank of the male rotor land and the mating flank of the female rotor groove are produced by travelling generation will thus be compensated by the more effective sealing between the rotors.

Owing to the fact that the crest connecting the flanks of each male rotor land 46 rolls without any sliding motion in relation to the bottom of the cooperating groove 50 of the female rotor this crest can with advantage be provided with a sealing strip for sealing cooperation with the barrel wall of the working space 26. In the same way the crest of each female rotor land 52 can be provided with a sealing strip for sealing cooperation with the barrel wall of the working space as this crest rolls without any sliding motion against the bottom of the cooperating groove 48 of the male rotor.

Figure 14:
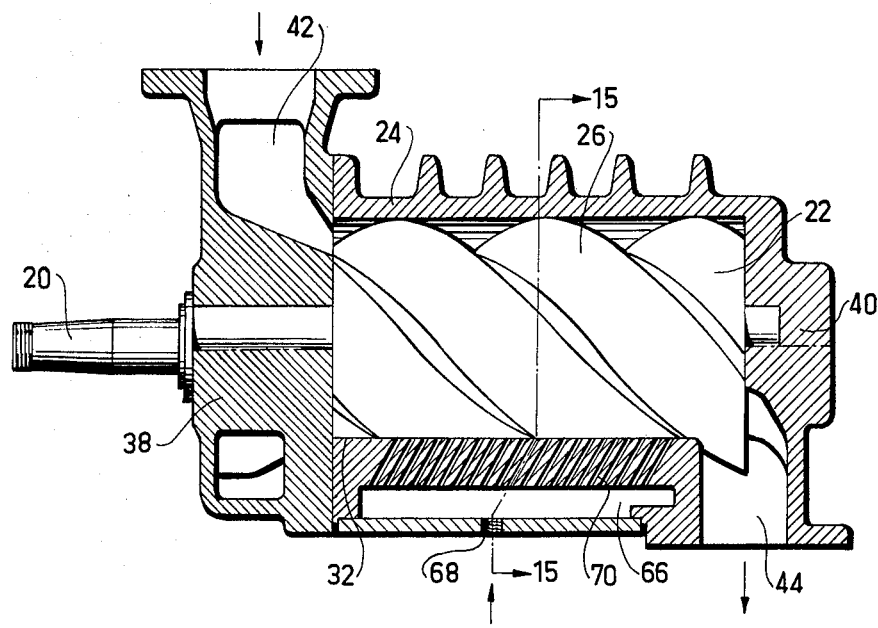
FIG. 14 shows a longitudinal section along the line 14—14 in FIG. 15 through another compressor according to the invention.
Figure 15:
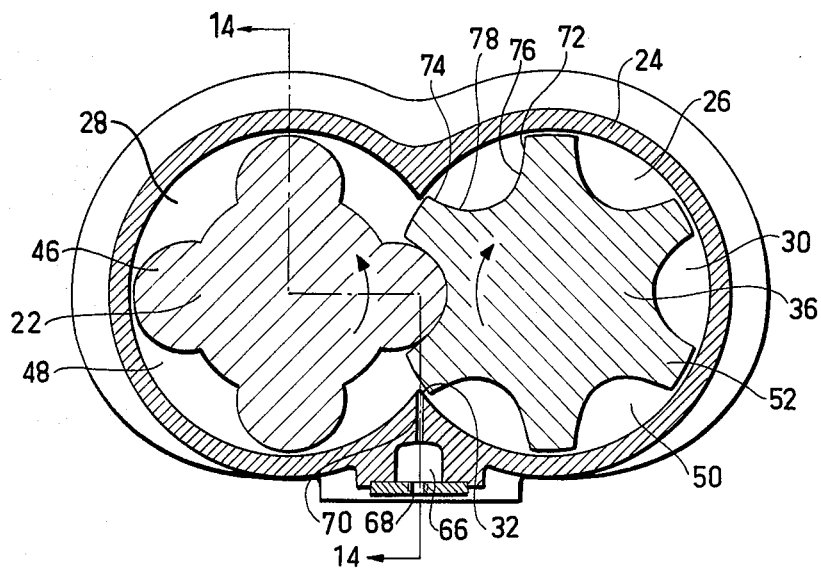
FIG. 15 shows a cross-section along the line 15—15 in FIG. 14.

In FIGS. 14, 15 and 15a another embodiment of the invention is shown. An essential difference between this embodiment and the one shown in FIGS. 1 and 2 is that the engine is provided with means for liquid injection, preferably oil injection, into the working space. This liquid injection means comprises a distribution chamber 66 for liquid to which the liquid is admitted from a pressure liquid source not shown through an inlet opening 68, and a number of liquid injection channels 70 which connect the distribution chamber 66 with the working space 26 and which have their mouths at or close to the intersection line 32 located at the high pressure port 44. Another essential difference in relation to the embodiment according to FIGS. 1 and 2 is that the flanks of the rotors have another profile. The different flanks are symmetrically located in the female rotor groove 50 and each of them is combined of two separate parts, viz. one circular portion 71 and one portion 72, 74 produced by travelling generation, by shaping the female rotor groove in a plane transverse to the axes of the rotor with a circular bottom portion 71 having its centre in the point 43 on the pitch circle 37 and a radius $r$ extending between two points, 76, 78 symmetrically located in the groove in such a way that the radii from the point 43 to these two points 76 and 78, respectively, form an angle of 90° and straight edge portions 72, 74 which form tangents to the circular bottom portion 71 at the radially outermost points 76, 78 thereof. The length of a radius vector $\rho$ swung from the point 43 will in this way decrease when the radius vector $\rho$ is swung from one point of a straight flank portion 72, 74 to another point on the same straight flank portion located nearer to the axis of the rotor. Each flank of the male rotor land will then be composed of a circular crest portion having its centre on the pitch circle and a portion adjacent to the root of the male rotor land generated by the straight portion of the female groove flank. In this way the advantage known from the circular profile is obtained that the outer portion of the male rotor land does not have any sliding movement in relation to the bottom of the mating female rotor groove simultaneously as the sliding movement obtained at generation by a point between the edge of the groove and the root portion of the land is replaced by a generation by a larger portion of the flank of the land as well as by a portion of the flank of the groove. In this way it is also avoided that the oil on the flanks of the male rotor lands will be scraped away by the edges of the female rotor grooves but instead a wedge-shaped oil film will be formed which is suitable to decrease the friction and thus the wear of the cooperating portions of the flanks. Owing to these characteristics this compressor is thus suitable for action without synchronizing gear which up to now has been an essential element to hold the rotors in such an angular position in relation to each other that there will be no direct contact between the flanks of the rotors.

Figure 17:
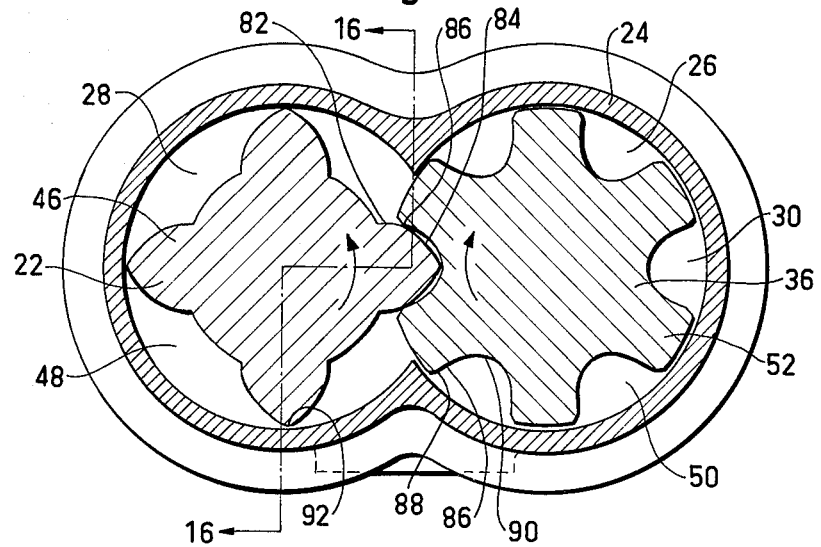
FIG. 17 shows a cross-section along the line 17—17 in FIG. 16.
Figure 16:
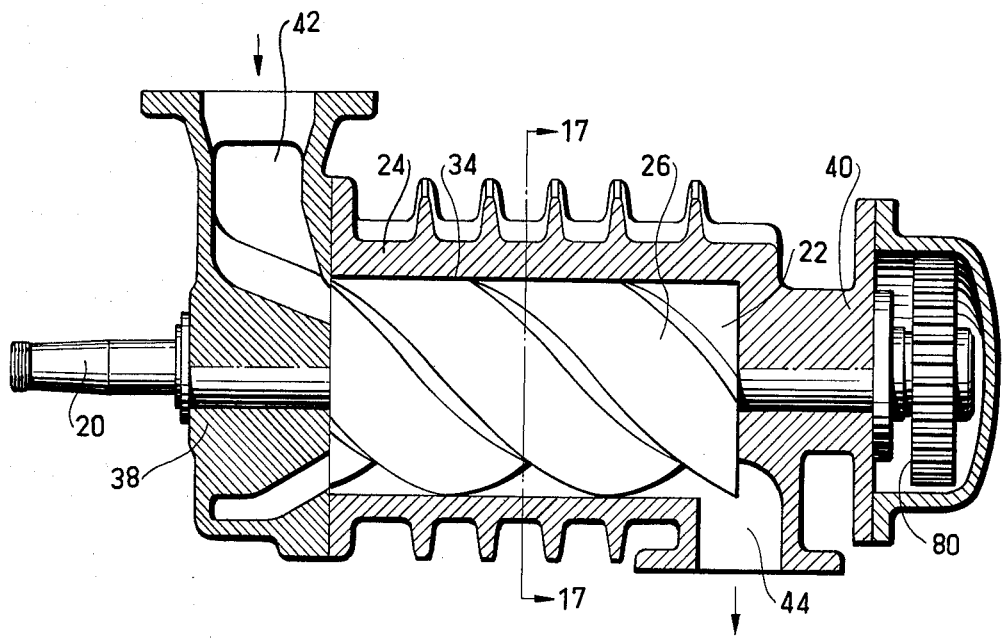
FIG. 16 shows a longitudinal section along the line 16—16 in FIG. 17 through a further compressor according to the invention.

In FIGS. 16, 17 and 17a a further embodiment of the invention is shown. A difference between this embodiment and the earlier described ones is that it is provided with a synchronizing gear 80 adapted to hold the rotors 22, 36 in such an angular position in relation to each other that they do not be in any mechanical contact with each other. In this embodiment the rotors are shaped in such a way that each flank of a female rotor groove 50 comprises an inner portion 90 extending radially outwardly from the bottom of the groove 50 to a point 86 and generated by the crest 92 of the mating male rotor land 46. Each male rotor flank comprises in the same way an outer portion 84 generated by the point 86 on the flank of the mating female rotor groove 50. Each flank of the female rotor groove 50 comprises further an outer portion 88 located radially outside the point 86 which portion follows a straight tangent to the radially innermost portion of the outer flank portion 84 of the mating male rotor land 46 when this land 46 is in maximum intermesh with the groove 50. Each flank of the male rotor land comprises correspondingly further an inner portion 82 produced by travelling generation of the outer portion 88 of the female rotor groove 50. This embodiment has the advantages in relation to the profile completely generated by points that the closed pockets will be smaller, that the sealing lines between the rotors will be shorter, and that for the generating point of the sharp edges a very blunt edge 86 in the female rotor groove 50 has been substituted so that the risk for damage of the generating point has been very considerably reduced. In relation to the profile completely produced by travelling generation this embodiment has the advantages that the volume of each rotor groove is larger and that the area of the blow hole is smaller.

Figure 18:
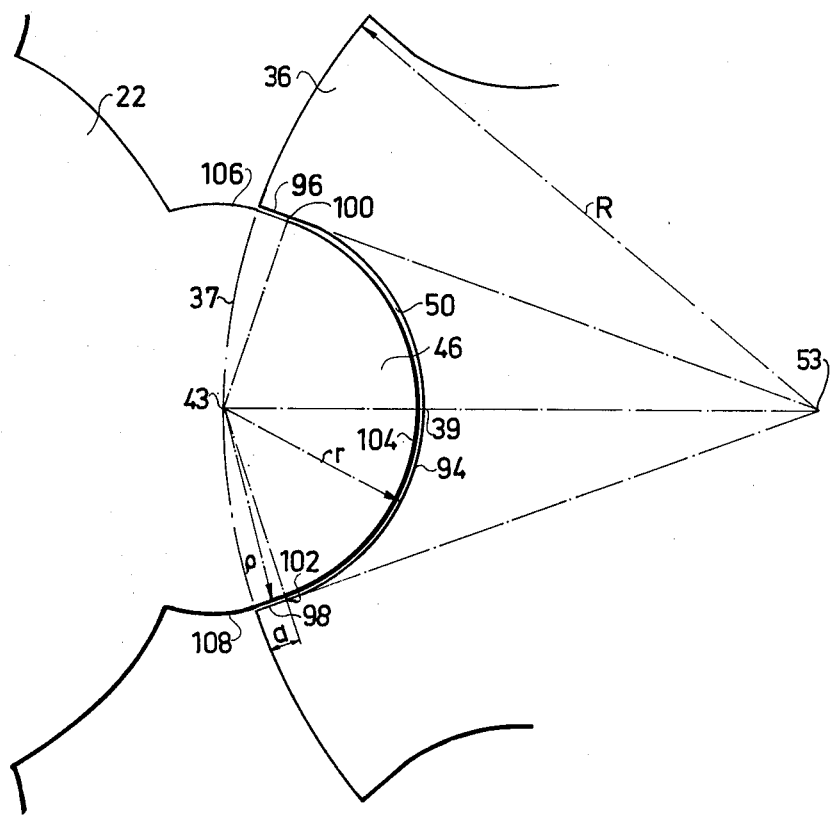
FIG. 18 shows a fragmentary cross-section through rotors having a further modified type of profile.

In FIG. 18 a fragmentary cross-section through a pair of rotors according to the invention is shown. These rotors 22 and 36 have exactly the same crest diameter and the crest circle 37 of the female rotor 36 coincides with the pitch circle 37 thereof and the root circle of the male rotor 22 coinicdes with the pitch circle thereof. The male rotor 22 is provided with four lands 46 and intervening grooves and the female rotor 36 is provided with six lands and intervening grooves 50. The relation between the radii of the pitch circles of the male rotor 22 and of the female rotor 36 is thus 4:6 which means that the maximum radial depth "$r$" of the female rotor groove 50 inside the pitch circle 37 of the rotor is a third of the radius R of the circumscribing circle 37 of the rotor 36.

The female rotor groove 50 comprises in a plane transverse to the axis of the rotor a circular bottom portion 94 having a radius "$r$" and its centre at the point 43 of intersection with the pitch circle 37 of a radial line drawn from the centre 53 of the rotor 36 through the radially innermost point 39 of the groove 50. Each flank of the groove 50 comprises further an outer portion 96 and 98, respectively, which in a plane transverse to the axis of the rotor is in the form of a tangent to circular bottom portion 94 drawn from the centre 53 of the rotor and touching the bottom portion 94 in a point 100 and 102, respectively. The outer flank portions 96, 98 of the groove 50 will in this way form a right angle with the pitch circle 37 of the rotor. The length of a radius vector $\rho$ swung from the point 43 on the pitch circle 37 furthermore decreases continuously as the vector is swung radially inwardly from the pitch circle to the point 100, 102.

The mating male rotor land 46 comprises in a plane transverse to the axis of the rotor a circular crest portion 104 having its centre on the pitch circle of the rotor. Each flank of the land 46 further comprises a root portion 106 and 108, respectively, which are produced by travelling generation of the outer flank portion 96 and 98, respectively, of the groove 50.

As easily can be calculated from the facts mentioned above the radial extent "$a$" of the travelling generated flank portion 96, 98 of the female rotor groove 50 will be $$a = 3r - 2r\sqrt{2}$$

The radial extent "$a$" of the travelling generated flank portion 96, 98 will thus be about 17% of the maximum radial depth "$r$" of the female rotor groove 50 inside the pitch circle 37.

A rotor profile of this type has the advantage owing to the fact that the travelling generated flank portion 96, 98 of the female rotor groove 50 forms a right angle with the pitch circle 37 that the forces acting on the rotors 22, 36 when they cooperate at the pitch circles will be perpendicular to the flanks of both rotors so that there is no component thereof directed in the direction of either flank which means that there is no sliding motion between the flanks of the rotors at this point of contact so that the edge of the flank 96, 98 of the female rotor groove 50 will not be subjected to any wear at all. This type of rotor profile thus distinguishes very definitely from all earlier known rotor profiles as the edge of the female rotor groove in all old types of profiles has been subjected to practically all the wear while as said above the edge of the female rotor groove in this type of profile is not subjected to any wear at all.

Though in the embodiments shown in FIGS. 14–18 with flanks composed of a portion produced by travelling generation and another portion formed in another way these flanks have only been shown with symmetrical lands and grooves it is of course possible to shape the lands and grooves asymmetrically, for instance by shaping a portion produced by travelling generation only on one flank or to combine lands and grooves of quite different flanks as shown in FIG. 3. The lands and grooves in this figure can of course also be changed in such a way that the circular flank of the female rotor groove is provided with an outer portion produced by travelling generation with the cooperating flank of the male rotor modified correspondingly.

Of course it is also possible to perform the conceivable combinations between on one hand the shown wet and dry compressors with and without synchronizing gears and on the other hand the different shown rotor profiles, i.e. the rotor profiles shown are not restricted to the type of screw compressor in connection with which they are shown. The invention is thus only limited by the following claims.

We claim:
1. Rotary piston engine comprising at least two cooperating male and female rotors with intermeshing helical lands and grooves and a casing providing a working space comprising coplanar intersecting bores for the rotors, said working space being provided with barrel walls and with low pressure and high pressure ports for a working fluid, the lands and grooves of said rotors being so shaped that they pass into and out of mesh with each other and together with the walls of the working space provide chevron shaped chambers, each comprising communicating groove portions of two cooperating rotors, said chambers varying in volume and communicating at different times with said low pressure and said high pressure ports as the rotors revolve, each land of the male rotor having two different flanks, each extending from the root circle of the rotor to the crest circle thereof, having at least its major portion located outside the pitch circle of the rotor and provided with a generally convexly curved profile, each groove of the female rotor having two different flanks, each extending from the root circle of the rotor to the crest circle thereof, having at least its major portion located inside the pitch circle of the rotor and provided with a generally concavely curved profile, the profiles of the flanks of each rotor being shaped to provide a sealing line along the intermeshing flank surfaces of the cooperating rotors, at least one flank of each groove of the female rotor comprising in a plane transverse to the axis of the rotor at least a portion of the flank extending inwardly from the pitch circle to a radially innermost point thereof located at a radial distance from the pitch circle amounting to at least 17% of the distance from the pitch circle to the radially innermost point of said one flank, said flank portion being defined by a radius vector swung rom the point of intersection with the pitch circle of a radial line drawn from the centre of the rotor through the radially innermost point of said one flank, the length of said radius vector decreasing continuously as the vector is swung from the radially outermost point of said portion of said one flank to the radially innermost point thereof, and the profiles of the lands of the male rotor being the envelopes developed by the profiles of the grooves of the female rotor as the grooves and lands pass into and out of mesh with each other, whereby said portion of said one flank of each female rotor groove generates the cooperating portion of a flank of a male rotor land by means of travelling generation.

2. Rotary piston engine as defined in claim 1 in which said flank portion of said one flank of the female rotor groove represents the major portion of said one flank.

3. Rotary piston engine as defined in claim 1 in which said one flank of the female rotor groove is the leading flank in the direction of rotation of the rotor.

4. Rotary piston engine as defined in claim 1, in which said flank portion of said one flank of the female rotor groove is defined by a straight line.

5. Rotary piston engine as defined in claim 4, in which said straight line is drawn through the centre of the rotor.

6. Rotary piston engine as defined in claim 1, in which said flank portion of said one flank of the female rotor groove is defined by a curve of the second degree.

7. Rotary piston engine as defined in claim 6, in which said curve of the second degree is a parabola having its focus located at a radial distance from the radially innermost point of said one flank which distance amounts to at least half the radial distance from said innermost point of said one flank to the pitch circle of the rotor.

8. Rotary piston engine as defined in claim 1, in which the remaining flank portion of said one flank of the female rotor groove located radially inwardly from the radially innermost point of said flank portion thereof in a plane transverse to the axis of the rotor is defined by a circular arc having its centre on the pitch circle of the rotor.

9. Rotary piston engine as defined in claim 1, in which the remaining flank portion of said one flank of the female rotor groove located radially inwardly from the radially innermost point of said flank portion thereof in a plane transverse to the axis of the rotor is defined by a curve generated by the crest of the mating male rotor land.

10. Rotary piston engine comprising at least two cooperating male and female rotors with intermeshing helical lands and grooves and a casing providing a working space comprising coplanar intersecting bores for the rotors, said working space being provided with barrel walls and with low pressure and high pressure ports for a working fluid, the lands and grooves of said rotors being so shaped that they pass into and out of mesh with each other and together with the walls of the working space provide chevron shaped chambers, each comprising communicating groove portions of two cooperating rotors, said chambers varying in volume and communicating at different times with said low pressure and said high pressure ports as the rotors revolve, each land of the male rotor having two different flanks, each extending from the root circle of the rotor to the crest circle thereof, having at least its major portion located outside the pitch circle of the rotor and provided with a generally convexly curved profile, each groove of the female rotor having two different flanks, each extending from the root circle of the rotor to the crest circle thereof, having at least its major portion located inside the pitch circle of the rotor and provided with a generally concavely curved profile, the profiles of the flanks of each rotor being shaped to provide a sealing line along the intermeshing flank surfaces of the cooperating rotors, at least one flank of each groove of the female rotor comprising in a plane transverse to the axis of the rotor at least a portion of the flank extending inwardly from the pitch circle and defined by a radius vector swung from the point of intersection with the pitch circle of a radial line drawn from the centre of the rotor through the radially innermost point of said one flank, the length of said radius vector decreasing continuously as the vector is swung from the radially outermost point of said flank portion of said one flank to the radially innermost point thereof, said flank portion of said one flank in the radially innermost point thereof being perpendicular to the radius vector passing through said point, and the profiles of the lands of the male rotor being the envelopes developed by the profiles of the grooves of the female rotor as the grooves and lands pass into and out of mesh with each other, whereby said portion of said one flank of each female rotor groove generates the cooperating portion of a flank of a male rotor land by means of travelling generation.

11. Rotary piston engine as defined in claim 10, in which the radially innermost point of said portion of said one flank of each female rotor groove is located at a radial distance from the pitch circle amounting to at least 17% of the distance from the pitch circle to the radially innermost point of said one flank.

12. Rotary piston engine as defined in claim 10, in which said radially innermost point of said portion of said one flank of the female rotor coincides with said radially innermost point of said one flank.

13. Rotary piston engine comprising at least two cooperating male and female rotors with intermeshing helical lands and grooves and a casing providing a working space comprising coplanar intersecting bores for the rotors, said working space being provided with barrel walls and with low pressure and high pressure ports for a working fluid, the lands and grooves of said rotors being so shaped that they pass into and out of mesh with each other and together with the walls of the working space provide chevron shaped chambers, each comprising communicating groove portions of two cooperating rotors, said chambers varying in volume and communicating at different times with said low pressure and said high pressure ports as the rotors revolve, each land of the male rotor having two different flanks, each extending from the root circle of the rotor to the crest circle thereof, having at least its major portion located outside the pitch circle of the rotor and provided with a generally convexly curved profile, each groove of the female rotor having two different flanks, each extending from the root circle of the rotor to the crest circle thereof, having at least its major portion located inside the pitch circle of the rotor and provided with a generally concavely curved profile, the profiles of the flanks of each rotor being shaped to provide a sealing line along the intermeshing flank surfaces of the cooperating rotors, each flank of each groove of the female rotor comprising in a plane transverse to the axis of the rotor at least a portion of the flank extending inwardly from the pitch circle to a radially innermost point thereof, which at least on one flank is located at a radial distance from the pitch circle amounting to at least 17% of the distance from the pitch circle to the radially innermost point of said one flank, each of said flank portions being defined by a radius vector swung from the point of intersection with pitch circle of a radial line drawn from the centre of the rotor through the radially innermost point of the flank comprising said flank portion, the length of said radius vector decreasing continuously as the vector is swung from the radially outermost point of said portion of said flank to the radially innermost portion thereof, and the profiles of the lands of the male rotor being the envelopes developed by the profiles of the grooves of the female rotor as the grooves and lands pass into and out of mesh with each other, whereby each of said portions of the flanks of each female rotor groove generate the cooperating portions of the flanks of a male rotor land by means of travelling generation.

14. A pair of cooperating rotors with coplanar axes and with intermeshing helical lands and grooves comprising a male rotor and a female rotor, the lands and grooves of said rotors being so shaped that they pass into and out of mesh with each other as the rotors revolve, each land of the male rotor having two different flanks, each extending from the root circle of the rotor to the crest circle thereof, having at least its major portion located outside the pitch circle of the rotor and provided with a generally convexly curved profile, each groove of the female rotor having two different flanks, each extending from the root circle of the rotor to the crest circle thereof, having at least its major portion located inside the pitch circle of the rotor and provided with a generally concavely curved profile, at least one flank of each groove of the female rotor comprising in a plane transverse to the axis of the rotor at least a portion of the flank extending inwardly from the pitch circle to a radially innermost point thereof located at a radial distance from the pitch circle amounting to at least 17% of the distance from the pitch circle to the radially innermost point of said one flank, said flank portion being defined by a radius vector swung from the point of intersection with the pitch circle of a radial line drawn from the centre of the rotor through the radially innermost point of said one flank, the length of said radius vector increasing continuously as the vector is swung from the radially innermost point of said portion of said one flank to the radially outermost point thereof, and the profiles of the lands of the male rotor being the envelopes developed by the profiles of the grooves of the female rotor as the grooves and lands pass into and out of mesh with each other, whereby said portion of said one flank of the female rotor groove generates the cooperating portion of a flank of a male rotor land by means of travelling generation.

References Cited by the Examiner

UNITED STATES PATENTS

| | | | |
|---|---|---|---|
| 1,821,523 | 9/1931 | Montelius | 103—128 |
| 2,174,522 | 10/1939 | Lysholm | 230—143 |
| 2,198,786 | 4/1940 | Montelius | 103—128 |
| 2,473,234 | 6/1949 | Whitfield | 103—128 |
| 2,486,770 | 11/1949 | Whitfield | 103—128 |
| 2,622,787 | 12/1952 | Nilsson | 230—143 |
| 2,922,377 | 1/1960 | Whitfield | 103—128 |

FOREIGN PATENTS 419,338 11/1934 Great Britain.

DONLEY J. STOCKING, *Primary Examiner.*